(12) United States Patent
Dubarry et al.

(10) Patent No.: US 10,608,454 B2
(45) Date of Patent: Mar. 31, 2020

(54) ELECTROCHEMICAL DEVICE, SUCH AS A MICROBATTERY, AND FABRICATION METHOD THEREOF

(71) Applicant: COMMISSARIAT À L'ENERGIE ATOMIQUE ET AUX ENERGIES ALTERNATIVES, Paris (FR)

(72) Inventors: Christophe Dubarry, Claix (FR); Raphaël Salot, Lans-en-Vercors (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 589 days.

(21) Appl. No.: 15/479,888

(22) Filed: Apr. 5, 2017

(65) Prior Publication Data

US 2017/0294785 A1 Oct. 12, 2017

(30) Foreign Application Priority Data

Apr. 7, 2016 (FR) ........................................ 1653082

(51) Int. Cl.
*H02J 7/00* (2006.01)
*H01M 10/04* (2006.01)
(Continued)

(52) U.S. Cl.
CPC ......... *H02J 7/007* (2013.01); *H01M 10/0436* (2013.01); *H01M 10/0562* (2013.01);
(Continued)

(58) Field of Classification Search
CPC .... H02J 7/007; H02J 7/0042; H01M 10/0436; H01M 10/486; H01M 10/44; H01M 10/0562; H01M 10/658; H01M 10/425; H01M 6/40; H01M 10/623; H01M 10/637; H01M 10/613; H01M 2300/0068
(Continued)

(56) References Cited

U.S. PATENT DOCUMENTS 7,144,655 B2 * 12/2006 Jenson ................. A61N 1/3787
429/162
9,373,864 B2 * 6/2016 Oukassi .............. H01M 4/0407
(Continued)

FOREIGN PATENT DOCUMENTS

DE 10056972 A1 5/2002
EP 0902494 A1 3/1999
(Continued)

*Primary Examiner* — M Baye Diao
(74) *Attorney, Agent, or Firm* — Oliff PLC (57) ABSTRACT

The electrochemical device includes a first stack of solid thin layers formed on a substrate, the first stack forming a battery and including: a first electrode and a second electrode separated by a first electrolyte layer, a first current collector in contact with the first electrode, a second current collector in contact with the second electrode. The device includes a second stack forming a thermometer. The second stack includes a third current collector and a fourth current collector separated by a second electrolyte layer forming a resistive layer, the second electrolyte layer being ionically dissociated from the first electrolyte layer. The device includes a control circuit configured to measure the resistance of the resistive layer.

20 Claims, 5 Drawing Sheets

(51) Int. Cl.
*H01M 10/0562* (2010.01)
*H01M 10/44* (2006.01)
*H01M 10/48* (2006.01)
*H01M 10/613* (2014.01)
*H01M 10/637* (2014.01)
*H01M 10/623* (2014.01)
*H01M 6/40* (2006.01)
*H01M 10/42* (2006.01)
*H01M 10/658* (2014.01)

(52) U.S. Cl.
CPC ......... *H01M 10/44* (2013.01); *H01M 10/486* (2013.01); *H02J 7/0042* (2013.01); *H01M 6/40* (2013.01); *H01M 10/425* (2013.01); *H01M 10/613* (2015.04); *H01M 10/623* (2015.04); *H01M 10/637* (2015.04); *H01M 10/658* (2015.04); *H01M 2300/0068* (2013.01)

(58) Field of Classification Search
USPC ........................................................ 320/134
See application file for complete search history.

(56) References Cited

U.S. PATENT DOCUMENTS

| | | | |
|---|---|---|---|
| 9,784,623 B2* | 10/2017 | Palanchoke | G01J 5/22 |
| 10,193,110 B2* | 1/2019 | Bedjaoui | H01M 2/0207 |
| 2008/0032236 A1 | 2/2008 | Wallace et al. | |
| 2009/0208815 A1 | 8/2009 | Dougherty | |
| 2016/0118645 A1* | 4/2016 | Oukassi | G02F 1/155 |
| | | | 429/231.95 |

FOREIGN PATENT DOCUMENTS

| | | |
|---|---|---|
| EP | 0913877 A1 | 5/1999 |
| EP | 1115172 A1 | 7/2001 |
| EP | 2631966 A1 | 8/2013 |
| FR | 3009136 A1 | 1/2015 |
| JP | 2014-013736 A | 1/2014 |
| WO | 0173864 A2 | 10/2001 |

* cited by examiner

ELECTROCHEMICAL DEVICE, SUCH AS A MICROBATTERY, AND FABRICATION METHOD THEREOF

FIELD OF THE INVENTION

The invention relates to an electrochemical device, such as a microbattery, and to its fabrication method.

STATE OF THE ART

Microbatteries are defined as being solid-state electrochemical generators formed by a stack of thin layers which comprises at least two (positive and negative) electrodes separated by an electrolyte. These microbatteries in particular make it possible to adapt the energy sources to the new mobile applications which are regularly proposed and which integrate electronic microcircuits.

The positive electrode is formed from a material having a good ionic conductivity, for example titanium oxysulphide (TiOS) or a lithiated metal oxide such as $LiCoO_2$, $LiNiO_2$, or $LiMn_2O_4$.

The electrolyte is an electric insulator having a high ionic conductivity such as lithium phosphorus oxynitride (LiPON), $LiNbO_3$, or NaSiCON.

The negative electrode is formed by metallic lithium or by a lithiated material or a metal. The microbatteries further comprise metallic current collectors, for example made from platinum or tungsten.

Fabrication of a microbattery consists in successively depositing several thin layers. The deposition can be performed in a vacuum. The layers are a patterned in different manners, for example by means of a mechanical mask. This technique is called shadow masking. Deposition of physical vapor deposition type (PVD) can be performed through a mask presenting openings in order to form batteries of centimetric size.

To fabricate smaller batteries, it is advantageous to use conventional semiconductor techniques. The documents FR 3009136, WO 01/73864 and US 2008/032236 describe monolithic battery fabrication methods.

It has been observed that the electric performances of the above-mentioned electrolytes change according to their temperature. As a general rule, the conductivity of the electrolyte increases when the temperature increases.

It is apparent that the operating temperature has a non-negligible influence on the electric properties of the battery. In order to avoid accidental or accelerated deterioration of the battery, the temperature of the battery has to be measured in order to take the necessary measures.

The document EP 1115172 proposes a temperature measurement method associated with temperature equalisation means as the performances of the batteries change with the temperature. Too low or too high operating temperatures can damage the batteries. The document EP 2631966 also indicates that extreme temperatures are detrimental to correct operation of the batteries and that the use of a coolant fluid is particularly advantageous to perform heat regulation.

The document EP 0913877 proposes measuring the temperature of a group of encapsulated batteries. The document proposes to perform heat regulation and to define safety rules according to the operating temperature of the batteries. Temperature measurement is used to detect end of charging or the occurrence of malfunctioning in the associated cooling device.

The document DE 10056972 proposes a particular arrangement of the temperature sensors so as to determine the temperature of the external enclosure of the battery.

However, it is apparent that the solutions proposed in the prior art do not enable the problems of degradation of the performances of the battery to be completely solved.

OBJECT OF THE INVENTION

The object of the invention is to remedy the shortcomings of the prior art, and in particular to propose an electrochemical device the temperature of which is measured more precisely.

This object tends to be achieved by an electrochemical device comprising a first stack of solid thin layers formed on the substrate, said first stack forming a battery and comprising:
  a first electrode and a second electrode separated by a first electrically insulating and ionically conductive electrolyte layer,
  a first current collector in contact with the first electrode,
  a second current collector in contact with the second electrode, the first current collector and second current collector being electronically insulated by the first electrolyte layer.

It is particularly advantageous to provide for the electrochemical device to comprise a second stack different from the first stack and to form a thermometer, said second stack comprising:
  a third current collector and a fourth current collector,
  a resistive layer comprising a second electrolyte layer in direct contact with the third current collector and fourth current collector to electrically connect the third current collector to the fourth current collector, the second electrolyte layer being ionically dissociated from the first electrolyte layer.

It is particularly advantageous to provide for the electrochemical device to comprise a control circuit configured to measure the resistance of the resistive layer.

In a particular embodiment, the control circuit is configured to measure the resistance of the resistive layer and to adjust the charging and/or discharging conditions of the battery according to the measured resistance value. It is then possible to have an electrochemical device presenting a better resistance with time of its electric performances.

This object is also achieved by a method for producing an electrochemical device comprising the following steps to fabricate a first stack forming a battery:
  forming a first electrode and a second electrode separated by an electronically insulating and ionically conductive electrolyte layer,
  forming a first current collector, the first current collector being connected to the first electrode,
  forming a second current collector, the second current collector being connected to the second electrode, the first current collector and second current collector being electronically insulated by the first electrolyte layer.

It is advantageous to provide for the method to comprise formation of a second stack distinct from the first stack to form a thermometer, the second stack being formed by means of the following steps:
  forming a resistive layer in a second electrolyte layer,
  forming third and fourth current collectors in contact with the resistive layer and separated by the resistive layer.

It is advantageous to provide for the method to comprise a step of connecting the third and fourth current collectors to a control circuit configured to measure the resistance of the resistive layer.

BRIEF DESCRIPTION OF THE DRAWINGS

Other advantages and features will become more clearly apparent from the following description of particular embodiments of the invention given for non-restrictive example purposes only, and represented in the appended drawings, in which.

DESCRIPTION OF A PREFERRED EMBODIMENT OF THE INVENTION

Figure 1:
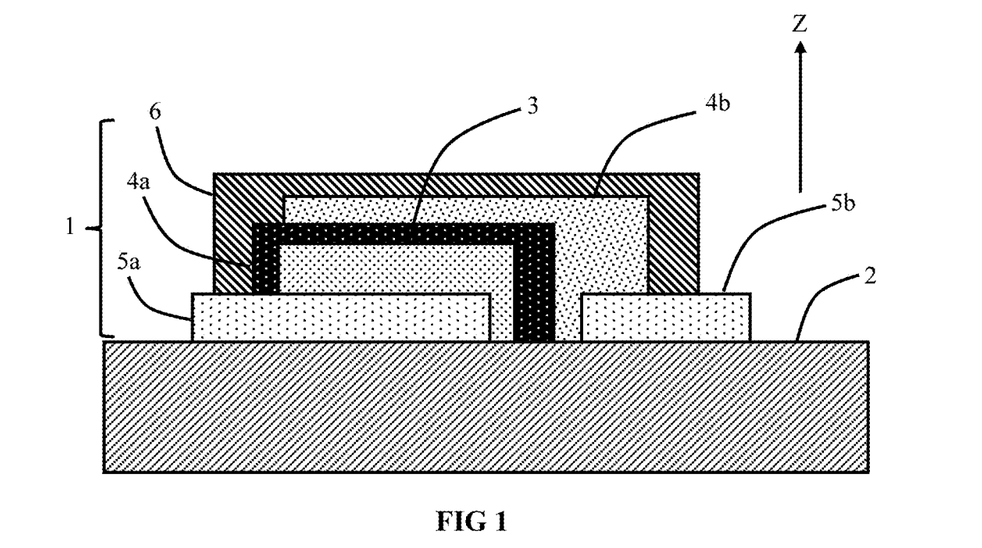
FIGS. 1 and 2 represent two stacks of thin layers forming batteries, in schematic manner, in cross-section.
Figure 2:
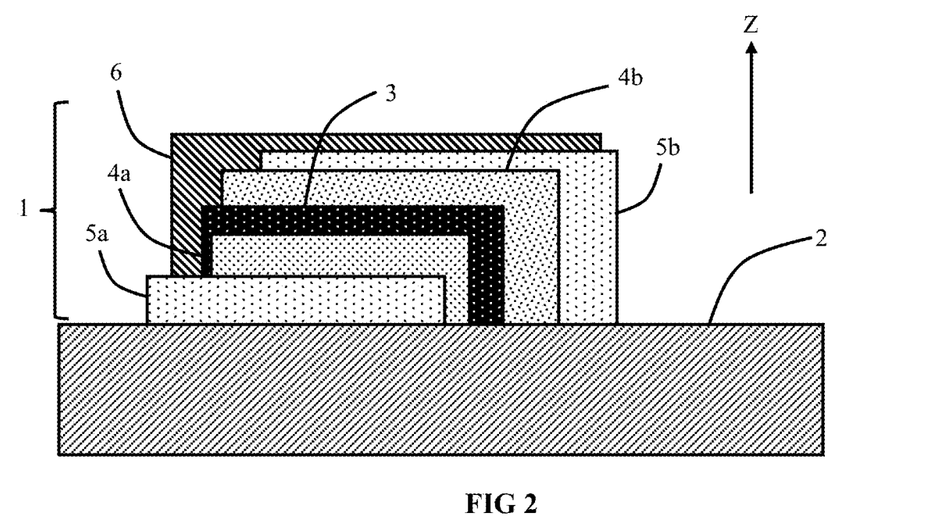

As illustrated in FIGS. 1 and 2, the electrochemical device comprises a first stack 1 of solid thin layers formed on a substrate 2. The first stack 1 forms a battery, advantageously a microbattery and even more advantageously a solid-state microbattery.

A microbattery is a solid-state electrochemical generator which is advantageously rechargeable. The thickness of a microbattery is small, for example between 30 µm and 200 µm. The microbattery is made on a substrate 2 and occupies a surface comprised between a few µm$^2$ and a few cm$^2$.

In an advantageous embodiment, the substrate 2 is electrically insulating. The substrate 2 can be made from an insulating material or it can comprise electrically conducting layers covered on the surface by an electrically insulating layer. The electrically insulating layer can be formed by a layer or by a stack of several layers. For example purposes, the electrically insulating layer is made from silicon oxide.

The substrate 2 is provided with a first surface and a second surface. The stack is deposited on the first surface of the substrate 2, i.e. on the electrically insulating surface.

In advantageous manner, the substrate 2 and preferentially the electrically insulating surface present barrier characteristics. Preferentially, the substrate and/or the electrically insulating surface are a lithium diffusion barrier.

The battery comprises a first electrolytic layer 3 which separates the two electrodes of the battery 4a and 4b. In this way, the electrodes 4a/4b are electrically insulated by means of the first electrolyte layer 3. The electrodes 4a and 4b are formed by electrically conducting materials. At least one of the electrodes is formed by a material which presents electrochemical properties with respect to the electrolyte layer 3, i.e. which is electrochemically active. The two electrodes 4a and 4b are separated by the electrolyte 3 which is ionically conductive and electrically insulating.

The battery also comprises first and second current collectors 5a and 5b. The first current collector 5a is electrically connected to the first electrode 4a. The second current collector 5b is electrically connected to the second electrode 4b. The first and second current collectors 5a and 5b are electrically insulated and in particular by means of the electrolyte layer 3 which is an ionically resistive but not electronically resistive material.

The materials forming the current collectors 5a and 5b are electrically conducting and are devoid of any electrochemical properties with respect to the electrolyte layer 3. The materials forming the current collectors 5a and 5b are therefore different from the materials forming the electrodes 4a and 4b. The current collectors are formed by electronic conductive materials and preferably only by electronic conductive materials. The electrodes are formed by materials which participate in the electrochemical mechanisms of the battery and in particular in the insertion and extraction phenomena of the Li, Na or H ions.

As an alternative embodiment, the current collectors 5a and 5b can be formed from electrode materials. These materials can be identical to or different from the materials used to form the electrodes 4a and 4b.

The first stack 1 can also comprise an encapsulation layer 6 which is electrically insulating and which has barrier properties in order to protect the battery from the external environment. The encapsulation layer 6 covers the stack described above completely and possibly leaving a part of the current collectors 5a and 5b uncovered. In preferential manner, the encapsulation layer 6 is a thermal insulator which enables the heat dissipation originating from the stack to be limited. The encapsulated components are thus at a more uniform temperature. The heat gradients are reduced.

In the embodiment illustrated in FIG. 1, the first stack comprises:
  the first and second current collectors 5a and 5b formed on the substrate 2,
  the first electrode 4a in electric contact with the first current collector 5a,
  the electrolyte layer 3 covering the first electrode 4a and possibly the first current collector 5a,
  the second electrode 4b in contact with the electrolyte layer 3 and separated from the first electrode 4a by the electrolyte layer 3, the second electrode 4b being in electric contact with the second current collector 5b,
  the encapsulation layer 6 covering the two current collectors 5a and 5b, the two electrodes 4a and 4b and the electrolyte layer 3.

In advantageous manner, in the embodiment illustrated in FIG. 2, the first stack 1 successively comprises:
  a first current collector 5a, covering a part of the substrate 2,
  a first electrode 4a covering at least a part of the first current collector 5a,
  an electrolyte layer 3 configured to cover at least a part of the first electrode 4a,
  a second electrode 4b at least partially covering the electrolyte layer 3 and possibly arranged to cover the first current collector 5a,
  a second current collector 5b at least partially covering the second electrode 4b, preferably totally covering the second electrode 4b,
  an encapsulation layer 6 at least partially covering the deposited layers and possibly leaving a part of the current collectors 5a and 5b free.

The substrate 2 can be a rigid substrate or a flexible substrate. It is advantageous to have a substrate 2 the thickness of which is comprised between 25 and 1000 µm. The substrate 2 can be formed by one or more polymer materials, for example from polyethylene terephthalate (PET), polyester or polyethylene naphtalate (PEN). It is also possible to form the substrate 2 from inorganic material, for example glass, silica, sapphire, or from metals. If the substrate 2 is a metallic substrate, it is possible to use stainless steel, titanium or nickel. The substrate then comprises an electrically insulating layer to prevent short-circuiting.

In advantageous manner, the electrolyte 3 is a solid electrolyte. Even more advantageously, the electrolyte 3 can be lithium-based, for example made from lithium nitride ($Li_3N$), LiPON, $Li_2S$—$P_2S_5$, LiSiPON, or from LiBON etc. It is also possible to use other electrolytes and preferentially sodium-based electrolytes, such as for example $Na_3PS_4$ or NaSiCON having the chemical formula $Na_{1+x}Zr_2Si_xP_{3-x}O_{12}$, with $0<x<3$. Depending on the intended application, the electrolyte 3 used can have a high or lower potential.

It is advantageous to use a solid electrolyte having an electronic conductivity lower than $10^{-12}$ or even $10^{-13}$ S/cm as this reduces the reactivity with respect to the electrodes 4a and 4b. The self-discharge is low which is a non-negligible advantage for producing long-life batteries, i.e. the batteries can be stored for a long time without being used. This also enables good coulomb efficiencies to be obtained which is very advantageous when the battery is associated with an energy recovery device, for example a renewable energy such as solar or wind energy.

The solid electrolyte 3 can be an inorganic electrolyte in the form of a glass. This type of material is particularly advantageous, in particular when the electrolyte 3 is a sulphide or an oxysulphide or a super-ionic sulphide ceramic glass $Li_2S$—$P_2S_5$, as the conductivity of the $Li^+$ ions is comparable to that of liquid electrolytes. Similar results are obtained for sodium batteries and for example by means of an electrolyte made from $Na_3PS_4$.

In an advantageous embodiment, the electrolyte 3 has a thickness comprised between 0.5 µm and 10 µm.

The first electrode 4a or the second electrode 4b is a positive electrode. The positive electrode is a cation or proton insertion electrode to insert for example $Na^+$, $Li^+$ or $H^+$. To form the positive electrode, it is possible to use the following materials: $LiCoO_2$, $V_2O_5$, $TiS_2$, $LiMn_2O_4$, $NaMnO_2$ or $NaCoO_2$.

The other electrode 4b or 4a is a negative electrode. The material used to form the negative electrode depends on the type of battery considered, i.e. on the type of electrolyte 3 used. The battery can be of the metallic lithium type. It can also be of lithium-ion type with electrodes made from insertion alloys chosen for example from SnLi, SiLi, GeLi. It is further possible to fabricate a lithium-free battery and in this case the electrodes 4a and/or 4b are unalloyed. The negative electrode can be made from a material that is not electrochemically active, for example from a material able to form a current collector, for example from copper. The same can be the case for sodium-based batteries.

In order to apply a homogenous electric voltage on the stack 1 and therefore inside the battery, it is advantageous to provide a first current collector 5a connected to the first electrode 4a and a second current collector 5b connected to the second electrode 4b. In the embodiment of FIG. 2, the two current collectors 5a and 5b are separated by the first electrode 4a, the electrolyte layer 3 and the second electrode 4b. It is also advantageous to limit or even to eliminate direct connection between the electrolyte 3 and each of the current collectors 5a and 5b.

The current collectors 5a and 5b can be formed by conductive transparent oxides, for example zinc-aluminium oxide, or indium-tin oxide. It is further possible to make the current collectors 5a and 5b from metal or a metallic alloy, for example from Cu, Ni, Ti, Mo, Pt, W or from $WSi_x$ alloy. It is also possible to make the current collectors from graphene.

The first and/or second current collectors 5a and 5b advantageously have a thickness comprised between 0.1 µm and 10 µm. In even more advantageous manner, the first and/or second current collectors 5a and 5b have a thickness of less than 1 µm. In a preferential embodiment, the first and/or second current collectors 5a and 5b have a thickness equal or substantially equal to 200 nm.

It is particularly advantageous to measure the temperature of the battery in order to be able to define as best as possible its charging and/or discharging conditions and/or to determine its state of charge if applicable.

Numerous approaches propose adding an external thermometer in proximity to the battery. The documents EP 0913877 and EP 0902494 describe making a cavity in the walls of the liquid electrolyte battery to approach to a thermometer as close as possible to the exothermal reactions of the battery.

This solution is not advantageous as it involves adding a thermometer of large dimensions next to the battery. If the battery is a microbattery, i.e. a battery having a thickness of less than 1 mm, the dimensions of the thermometer are large compared with those of the microbattery. The more bulky the thermometer in comparison with the battery, the more the thermal performances of the assembly are influenced by the mass of the thermometer. The thermometer can introduce a non-negligible thermal mass which can be problematic when the heat source is formed by the battery. The thermometer measures a temperature which is different from that of the microbattery and more particularly during transient phases.

Furthermore, subsequent addition of a thermometer represents a large risk of introducing defects which may degrade the battery which has already been produced or is at least likely to reduce the fabrication yield of the batteries. It therefore appears counter-productive to fabricate a battery and then to add a thermometer produced elsewhere in a different technology to the latter.

In order to keep a large integration density and/or to preserve high battery fabrication yields, the inventors propose to fabricate a thermometer in immediate proximity to the battery and more particularly to fabricate a thermometer from certain layers used to form the batteries. This choice of materials enables the physical and chemical constrains linked to the addition of new materials in the fabrication process to be reduced. If the materials are identical between the thermometer and the battery, this also results in a reduction of the technological fabrication steps. In advantageous manner, the thermometer is located at a distance of less than 2 mm from the microbattery. In even more advantageous manner, the distance between the microbattery and the thermometer is comprised between 20 µm and 2 mm. What is meant by distance is the smallest dimension separating the thermometer and the battery.

In addition to the first stack 1, the electrochemical device comprises a second stack 7 forming a thermometer or temperature sensor. As illustrated in FIGS. 3, 4, 5, 6, 7, 8, 9 and 10, the second stack 7 is different and advantageously distinct from the first stack 1. The two stacks are offset in a direction Y perpendicular to the direction Z along which the layers of the first stack 1 are superposed. The two stacks can be offset in a direction parallel to the axis of the surface of the substrate 2 on which the stacks 1 and 7 are formed. It is possible to provide for the microbattery to be placed under the thermometer or on the thermometer. It is then advantageous to electrically insulate these two components by means of an insulating layer which is advantageously made from $SiO_2$ or $Al_2O_3$.

This second stack 7 comprises third and fourth current collectors 5c and 5d which are electrically separated by a resistive layer 8 formed by a second electrolyte layer which is advantageously a solid electrolyte. The second electrolyte layer is formed by an electrically insulating and ionically conductive material. As indicated in the foregoing, the electric performances (conductivity/resistivity) of the electrolytes change according to the temperature. This second stack 7 is advantageously devoid of cation or proton insertion material in order to prevent the second stack from operating as a battery. In advantageous manner, the second stack 7 is devoid of a cation or proton insertion material which is in direct contact with the electrolyte and with the current collector 5c or 5d, i.e. the second stack is devoid of a positive electrode material in contact with the third current collector and with the second electrolyte layer.

In preferential manner, the second stack is devoid of a second electrode material in contact with the fourth current collector 5d and the second electrolyte layer.

It is also advantageous to provide for the third current collector 5c to be partially covered by the resistive layer 8 and for the fourth current collector 5d to partially cover the resistive layer 8 and third current collector 5c. In preferential manner, the fourth current collector 5d leaves at least one side wall of the resistive layer 8 uncovered to reduce short-circuiting problems.

The resistance formed by the resistive layer 8 between the third and fourth current collectors 5c and 5d changes with the temperature and will enable the temperature of the resistive layer 8 to be monitored. This modification of the electric performances is used here in astute manner to form an absolute thermometer, i.e. a thermometer which links the temperature to another quantity of the international system, here the electric performances.

The second electrolyte forming the resistive layer 8 can be identical to or different from the first electrolyte 3 of the battery.

It is particularly advantageous to choose a second electrolyte which presents a conductivity situated in the $10^{-3}$-$10^{-7}$ S·cm$^{-1}$ range.

The inventors observed that the volume of electrolyte used enables the resolution of the thermometer to be at least partially defined. It is advantageous to provide for the volume of electrolyte to be comprised in the 5000 µm$^3$-$2*10^8$ µm$^3$ range.

It is particularly advantageous to have an electrolyte layer thickness comprised between 0.5 µm and 2 µm in order to have a compact thermometer providing a good resolution. It is also advantageous to provide for the surface occupied by the electrolyte layer of the thermometer to be comprised between $10^{-4}$ cm$^2$ and 1 cm$^2$.

Measurement of the resistance of the resistive layer 8 enables the conductivity of the resistive layer 8 and therefore the temperature of this layer to be determined. Measurement of the resistance can be obtained easily by measuring the voltage which exists between the third and fourth current collectors 5c and 5d, and the value of the current flowing between the third and fourth current collectors 5c and 5d. The dimensions of the layer 8 being defined, measurement of the electric performances of the electrolyte can be made by measuring either the voltage between the two current collectors or the current flowing between the two current collectors.

The temperature dependence can be represented in the form of the following equation $$TCR = \frac{(R_T - R_{ref})}{R_{ref}} * \frac{1}{\Delta T}$$

where
$R_{ref}$ represents the value of the resistance of the film 8 at a reference temperature,
$R_T$ represents the value of the resistance of the film 8 at a temperature T,
$\Delta T$ represents the difference between the reference temperature and the temperature T for example in ° C. or in K.

FIGS. 3 to 6 represent different alternative embodiments of a thermometer.

Figure 3:
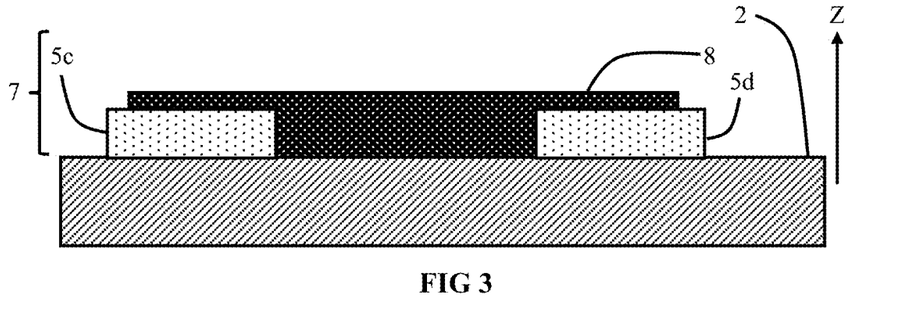
FIGS. 3, 4, 5 and 6 represent stacks of thin layers forming thermometers according to the invention, in schematic manner and in cross-section.

FIG. 3 illustrates an embodiment where the third and fourth current collectors 5c and 5d are formed before the resistive layer 8. The current collectors 5c and 5d are at least partially covered by the resistive layer 8. As a variant, the two collectors can be formed after the layer 8. The embodiment illustrated in FIG. 3 is particularly advantageous as it is simple to achieve. It is however advantageous to provide partial covering of the thermometer by an electrically insulating material such as $SiO_2$ and $Al_2O_3$ in order to avoid short-circuits when deposition of the subsequent layers is performed.

Figure 4:
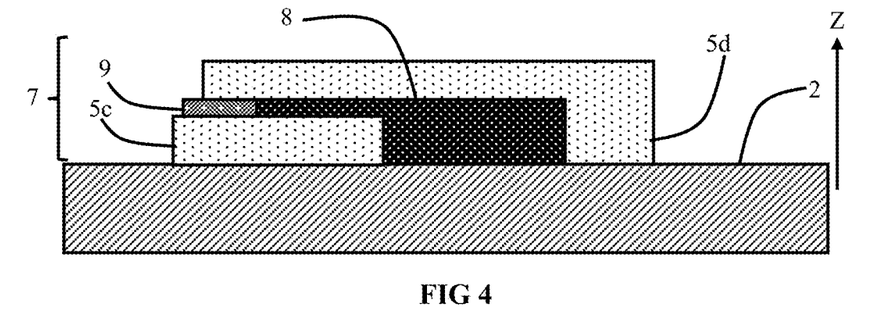
Figure 5:
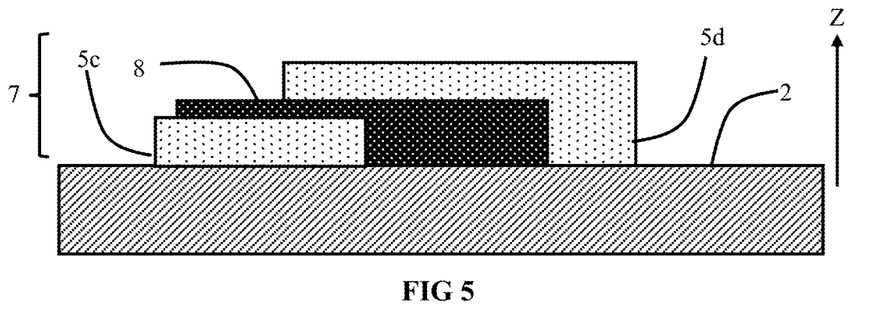
Figure 6:
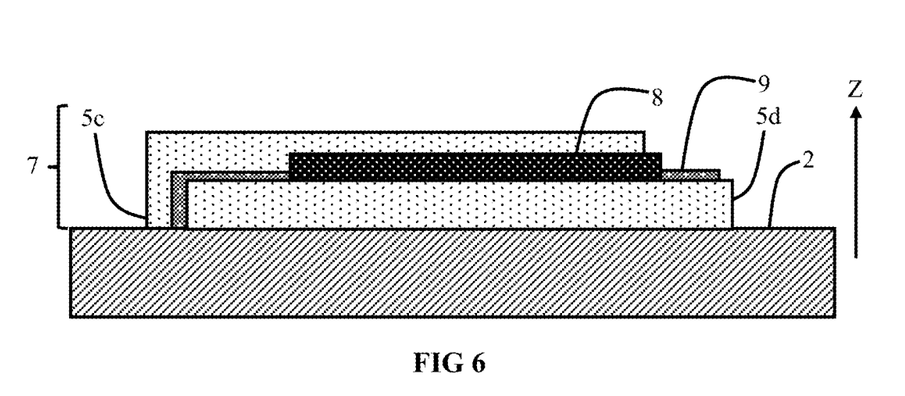

In other advantageous embodiments illustrated in FIGS. 4, 5 and 6, the second stack 7 successively comprises:
  a third current collector 5c covering a part of the substrate 2,
  a resistive layer 8 formed by a solid electrolyte in contact with the third current collector 5c, the resistive layer 8 at least partially covering the third current collector 5c,
  a fourth current collector 5d at least partially covering the resistive layer 8, the fourth current collector 5d being electrically separated from the third current collector 5c by the resistive layer 8.

In advantageous manner, the fourth current collector 5d leaves a part of the top wall of the resistive layer 8 uncovered to reduce short-circuiting problems.

In these embodiments, the second stack 7 successively comprises, in a direction passing through said second stack and substrate 2: the third current collector 5c, resistive layer 8 and fourth current collector 5d.

The third current collector 5c and/or fourth current collector 5d can be formed by the materials described in the foregoing for the first and second current collectors 5a and 5b and they can be made with the same thicknesses.

In the embodiments illustrated in FIGS. 4 and 6, an electrically insulating layer 9 is used, in addition to the resistive layer 8, to electrically separate the current collectors 5c and 5d.

Using the change of conductivity of the resistive layer 8 according to the temperature is particularly advantageous in comparison with other techniques.

This configuration is even more advantageous than a structure comprising one or more thermocouples and which requires the establishment of a reference area where the temperature is known or controlled so as to know the temperature difference existing between the studied area and the reference area.

It is particularly advantageous to provide for the same materials to be used to form the battery and the thermometer. The thermometer can be represented as a battery without the first and second electrodes 4a and 4b.

In order to measure the voltage and/or current between the third and fourth current collectors 5c and 5d, the device comprises a voltage sensor and/or a current sensor, for example a voltmeter and/or an ammeter. By means of this information, it is possible to calculate the resistance of the resistive film 8 and to deduce the temperature therefrom.

For example purposes, a thermometer formed with an electrolyte pad having a surface of 1 cm and a thickness of 2 µm makes it possible to obtain a resistance of about 200 Ohm and a derivative of about 2 Ohm/K which is easy to measure to monitor the temperature changes.

It is particularly advantageous to provide for a thermally insulating layer to cover the first stack 1 and second stack 7 in order to prevent too large heat leaks between the battery and the thermometer.

During operation, either charging or discharging, the battery generates heat, and it is therefore at a different temperature from its environment. The thermometer measures the temperature of the resistive film 8 and it becomes possible to deduce the temperature of the battery therefrom. By placing the thermometer close to the battery and by directly or indirectly measuring the resistance of the resistive film 8, it is possible to deduce the temperature of the battery formed by the first stack 1 therefrom.

As indicated in the foregoing, this temperature monitoring of the battery is facilitated by the use of a thermally insulating encapsulation layer. In advantageous manner, the thermally insulating encapsulation layer presents a resistivity in the 1 to 2 W·m$^{-1}$·K$^{-1}$ range.

Figure 9:
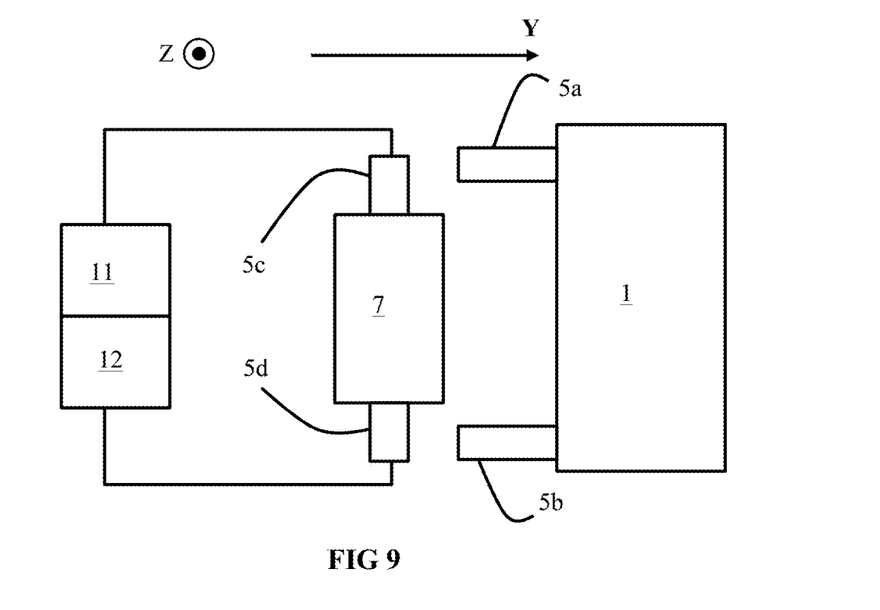
FIG. 9 represents fabrication of a first stack forming a battery and of a second stack forming a thermometer, in schematic manner, in top view

As illustrated in FIG. 9, the two terminals of the thermometer are connected to a control circuit 11 which is configured to measure the electric characteristics of the resistive film 8 and advantageously the resistance of the film, i.e. an electric quantity which is representative of the measured temperature. The control circuit 11 can provide this information to the user or to another circuit which will initiate other actions dependent on the measured temperature. It is advantageous to provide for the control circuit to be supplied by the battery to achieve a gain in compactness.

The device comprises at least three electrically distinct terminals, for example four electrically distinct terminals. The microbattery has two different terminals advantageously formed by the positive current collector and the negative current collector. The thermometer also has two distinct terminals to be able to measure the resistance of the film 8.

Figure 10:
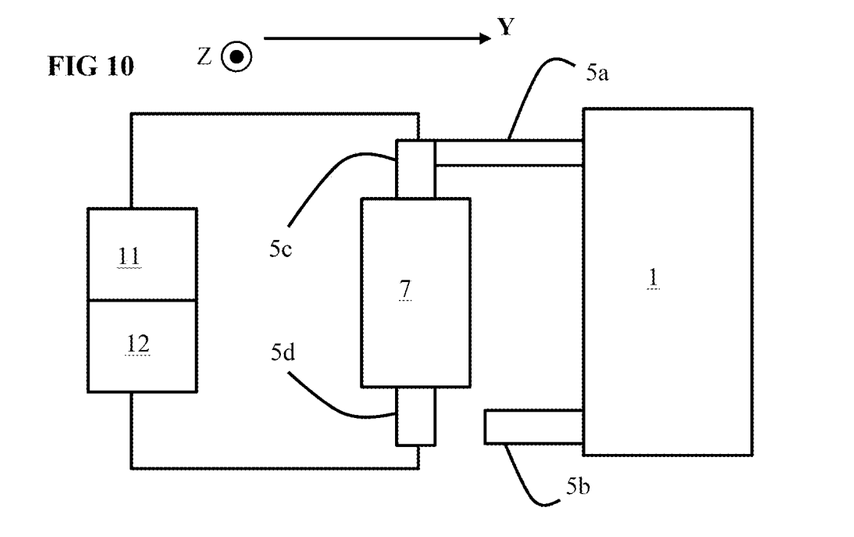
FIG. 10 represents an alternative embodiment of a first stack forming a battery and of a second stack forming a thermometer, in top view, in schematic manner.

In one case, one of the terminals of the microbattery is common with one of the terminals of the thermometer as illustrated in FIG. 10. The other two current collectors can be electronically dissociated, for example the second and the fourth current collectors. In another case illustrated in FIG. 9, the four terminals are electrically dissociated.

In a particular embodiment, the thermometer is connected to a control circuit 11 which is configured to modulate the charging and/or discharging conditions of the battery, for example the charging or discharging current and/or voltage, according to the measured temperature. The control circuit 11 can comprise for example a processor which processes the different data received.

According to an alternative embodiment of the invention, the information provided by the thermometer to the control circuit 11 enables operation of the battery to be managed according to the measured temperature. The control circuit 11 is configured to compare the measured value with at least one threshold to enable or disable charging and/or discharging. In this way, when the control circuit 11 detects that the measured temperature reaches a threshold value which may damage the battery, the control circuit 11 can stop charging and/or discharging of the battery. It can also modify the charging and/or discharging conditions by modulating the voltage and/or current. It is possible to use other threshold values.

In advantageous manner, the control circuit 11 is configured to compare the measured value with the least one threshold to enable or disable charging and/or discharging.

According to another alternative embodiment of the invention, the information provided by the thermometer enables the control circuit 11 to know the energy and power available in the battery at all times. The capacity of the battery which can be in the order of several mAh can be recalculated taking the temperature into account. The energy of the microbattery is given by the formula:

$$E=Q(V-I\cdot R)$$

With E the energy available in the microbattery,
Q the capacity of the battery in coulomb,
V the voltage at the terminals of the microbattery in Volt,
R the internal resistance of the microbattery in Ohm,
I the current flowing from or to the microbattery in Amps.

As indicated in the foregoing, the capacity of the battery depends on its internal resistance. The electric characteristics of the electrolyte consequently change with the change of temperature. It is then possible to monitor the internal resistance of the battery. By means of this internal resistance measurement, it is then possible to recalculate the electric capacitance of the battery in Farad.

It is also possible to more easily monitor a safety temperature by monitoring for example a parameter RC which represents a time constant characteristic of the battery. R is the internal resistance of the battery and C is the electric capacitance of the battery in Farad.

Figure 7:
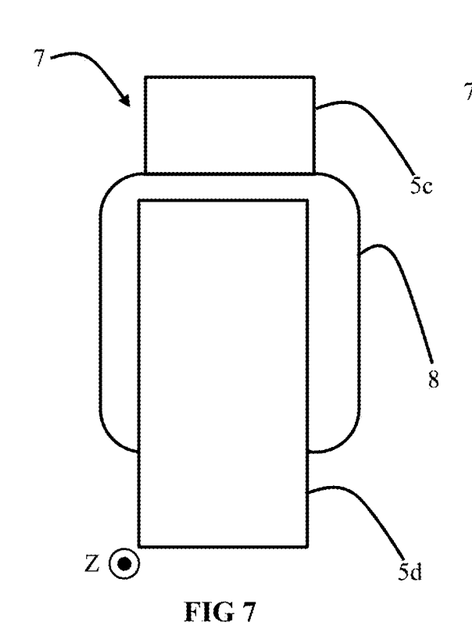
FIGS. 7 and 8 represent two stacks of thin layers forming thermometers according to the invention, in schematic manner and in top view.
Figure 8:
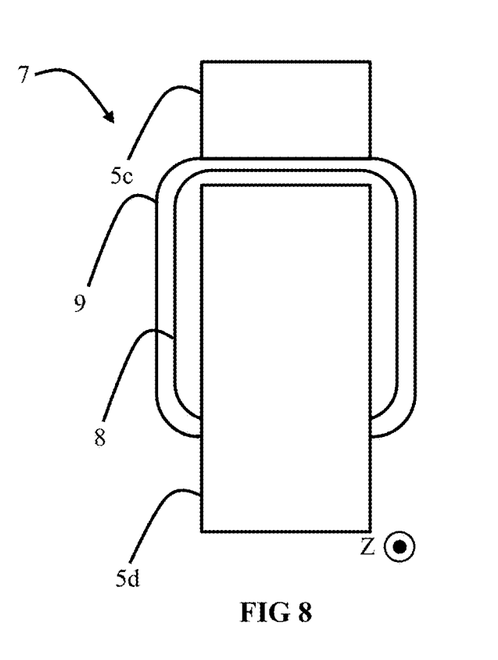

FIGS. 7 and 8 illustrate, in top view, two embodiments of a thermometer in relation with the embodiments of FIGS. 4, 5 and 6. The embodiment of FIG. 7 illustrates a single stack of layers. The resistive layer 8 covers the current collector 5C. The current collector 5D covers the resistive layer 8. In the embodiment of FIG. 8, the insulating film 9 surrounds the resistive film 8 or overshoots beyond the resistive film 8. Advantageously, the resistive layer 8 partially covers a top surface of the third current collector 5c so as to define an area in the form of a ring devoid of any overlap. The fourth current collector 5d completely covers the resistive layer 8 and an insulating film 9 which separates the third and fourth current collectors 5c and 5d. According to the embodiments, the insulating film 9 can be deposited before or after the resistive film 8.

In a first embodiment illustrated in FIG. 9, the thermometer is supplied by a voltage or current source 12 which is different from the first stack 1. For example, the thermometer is supplied by the control circuit 11 which comprises the voltage or current source 12.

In a second embodiment illustrated in FIG. 10, the thermometer is supplied by the first stack 1. The battery delivers a current which passes through the resistive layer 8. In advantageous manner, one of the current collectors of the first stack 1 is electrically connected with one of the current collectors of the second stack 7. It is also possible to provide for the two current collectors of the battery to be electrically connected to the two current collectors of the thermometer, for example the first collector with the third collector and the second collector with the fourth collector.

In particularly advantageous manner, one of the current collectors of the first stack 1 is common with one of the current collectors of the second stack 7. The other current collector of the first stack can be separated from the other current collector of the second stack by means of a switch (not represented). In the illustrated example, the collectors 5a and 5c are common. The battery supplies the control circuit 11 which is configured to measure the resistance of the resistive film. The control circuit 11 measures the resistance by means of the voltage at the terminals of the film 8 and of the current flowing through the film 8. The control circuit 11 can then provide the measured temperature or information representative of the measured temperature.

In an alternative embodiment, the control circuit 11 is not configured to modulate the charging or discharging conditions of the battery according to the temperature. In this case, it may be advantageous to use the device as a power-supplied thermometer which is able to measure the temperature of a third party component. The control circuit 11 measures the electric characteristics of the resistive film in order to provide information on the measured temperature.

This configuration is particularly advantageous as the fabrication method can be simplified in comparison with what is performed in the prior art. The first and third current collectors 5a and 5c can be formed simultaneously. It is also possible to provide for the second current collector to be formed simultaneously with the fourth current collector. For example, the two current collectors are defined by means of the same mask when performing deposition or etching if this is the case. It is also possible to use conventional design rules to place the thermometer as close as possible to the battery. As the thermometer is place in immediate proximity to the battery, the temperature of the battery is measured more precisely by the thermometer and/or more rapidly.

Figure 11:
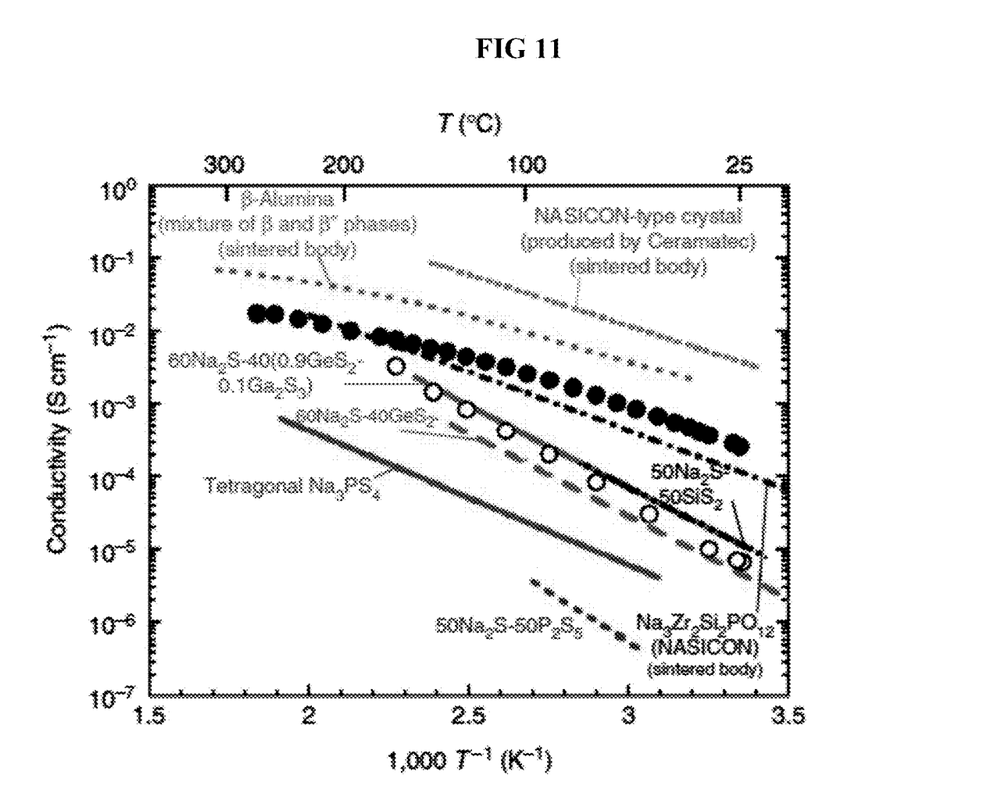
FIGS. 11 and 12 represent the variation of the electric conductivity of several electrolytes versus the inverse of the temperature.
Figure 12:
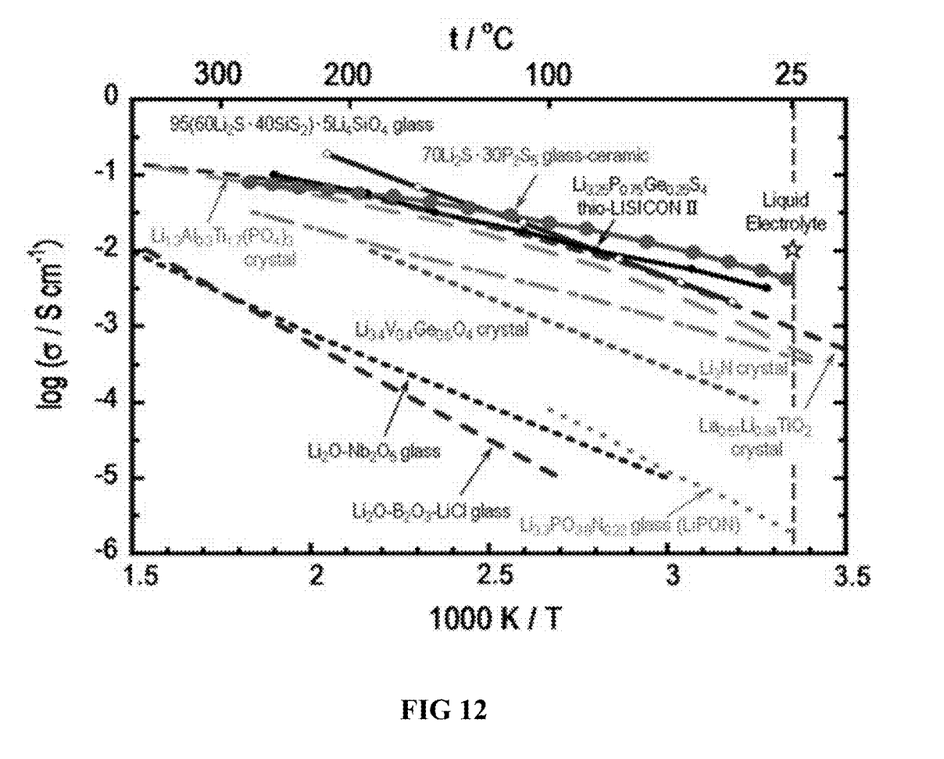

FIGS. 11 and 12 represent the variation of the conductivity of several inorganic electrolytes versus their temperature. Each of the solid electrolytes presented in these figures can be used to form the microbattery and/or the thermometer.

In a first embodiment, the substrate 2 is a glass substrate having a thickness equal to 1 mm. The third current collector 5c is made from tungsten and its thickness is equal to 1000 nm. The resistive layer 8 is made from LIPON with a thickness equal to 2 μm. The fourth current collector 5d is made from tungsten and its thickness is equal to 250 nm. In order to avoid short-circuiting between the third and fourth current collectors 5c and 5d, a silicon oxide layer with a thickness equal to 100 nm is used. This exemplary embodiment can be integrated according to one of the modes illustrated in FIGS. 3 and 5.

In a second embodiment, the substrate 2 is a titanium substrate having a thickness equal to 50 μm. The substrate 2 is covered by an electrically insulating layer 9 formed by a layer of silicon oxide with a thickness equal to 100 nm. The third current collector 5c is made from platinum and its thickness is equal to 100 nm. The resistive layer 8 is made from LIPON with a thickness equal to 2 μm. The fourth current collector 5d is made from platinum and its thickness is equal to 100 nm. In order to prevent short-circuiting between the third and fourth current collectors 5c and 5d, a silicon oxide layer 9 with a thickness equal to 100 nm is used. This exemplary embodiment can be integrated according to one of the modes illustrated in FIGS. 4 and 6.

In a third embodiment, the substrate 2 is a glass substrate having a thickness equal to 50 μm. The substrate 2 is covered by an electrically insulating layer 9 formed by a silicon oxide layer having a thickness equal to 100 nm. The third current collector 5c is made from platinum and its thickness is equal to 250 nm. The resistive layer 8 is made from LIPON with a thickness equal to 2 μm. The fourth current collector 5d is made from platinum and its thickness is equal to 250 nm. This exemplary embodiment can be integrated according to one of the modes illustrated in 3 and 5.

In a fourth embodiment, the substrate 2 is a glass substrate having a thickness equal to 500 μm. The third current collector 5c is made from $WSi_x$ and its thickness is equal to 1000 nm. The resistive layer 8 is made from $Li_2S\_P_2S_5$ with a thickness equal to 2 μm. The fourth current collector 5d is made from $WSi_x$ and its thickness is equal to 1000 nm. This exemplary embodiment can be integrated according to one of the modes illustrated in FIGS. 3 and 5.

To form the thermometer, it suffices to form the third current collector 5c, the fourth current collector 5d and the resistive layer 8. The order of the steps is of little importance so long as the third current collector 5c is placed in contact with the fourth current collector 5d only by means of the resistive layer 8.

To form the battery, it is advantageous to form the first and second current collectors 5a and 5b, the two electrodes 4a and 4b and the electrolyte layer 3. There again, the order of the steps can vary according to the embodiments. It is nevertheless necessary to make sure that the two electrodes are in direct contact with the electrolyte layer 3 and that the two electrode are electrically insulated from one another. The two electrodes 4a and 4b are nevertheless connected by means of the electrolyte layer 3.

According to the embodiments, the thermometer can be formed before, after or at the same time as the battery. It is nevertheless advantageous for them to use several common technological steps in order to limit costs and to preserve good physico-chemical compatibilities.

More particularly, a microbattery 1 and thermometer 7 can be produced with a method comprising the following successive steps:
  providing a substrate 2 covered by a first current collector, the first current collector being at least partially covered by a first pattern made from a first electrode material, the first pattern forming the first electrode,
  depositing an electrolyte layer 3 so as to at least partially cover the first pattern made from first electrode material,
  forming a second pattern made from second electrode material on the electrolyte layer 3 so as to at least partially cover the first pattern, the second pattern being electrically separated from the first pattern by the electrolyte layer, the second pattern forming the second electrode,
  depositing a second current collector covering the second pattern above the covered area and covering the electrolyte above the uncovered area.

When formation of the first current collector is performed, it is also possible to form the third current collector and possibly the fourth current collector.

When deposition of the electrolyte layer 3 is performed, this layer can be used to form the battery and possibly the resistive layer 8. The two electrolyte layers are formed simultaneously.

When formation of the second electrode 4b is performed, it is advantageous to protect the future thermometer to prevent deposition of the catalytic material on the resistive layer 8.

When deposition of the second current collector is performed, it is advantageous to form the fourth current collector. It is also possible to form the third and fourth current collectors.

As a variant, it is further possible to form the third current collector and/or fourth current collector by means of two depositions of materials which are deposited above and below the resistive layer. These two depositions can for example be performed at the same time as formation of the first current collector and second current collector.

The method comprises one or more patterning steps of the deposited layers so as to form two distinct stacks. The second stack 7 is advantageously devoid of the first electrode material and of the second electrode material.

In one embodiment, the different layers are deposited through a mask comprising recesses. In this way, the different layers can form patterns as soon as they are deposited. The two distinct stacks are progressively formed.

As a variant, the layers are deposited in continuous manner on the whole substrate, by means of a technique called full sheet, and are then etched so as to pattern them. Etching can be performed by any suitable technique, for example by plasma by means of a mask or by means of a laser beam. The two stacks are formed at the same time but they are dissociated progressively as the etching steps are performed.

It is also possible to combine these two embodiments between the different layers.

In more particular manner, the substrate 2 is provided and the first current collector material is then deposited. As indicated in the foregoing, depending on the embodiments used, the first current collector material is deposited through a mask to form the first and third current collectors. As a variant, the first current collector material is deposited and then etched to form the first and third current collectors 5a and 5c.

A first pattern made from first electrode material is formed on the first current collector 5a to define the first electrode 4a. This first pattern can be formed by deposition through a mask or by deposition followed by etching of the first electrode material. According to the embodiments, the first pattern can partially or completely cover the first current collector 5a. It is also possible to provide for the first pattern to extend beyond the first current collector 5a. This first pattern forms the first electrode 4a.

The electrolyte material is then deposited. The electrolyte material can partially or completely cover the first pattern. The electrolyte material will form the electrolyte layer 3. It is also possible to provide for the electrolyte layer 3 to extend beyond the first pattern for example to cover the first current collector 5a or possibly the substrate 2.

The electrolyte material can partially or completely cover the third current collector 5c. The electrolyte material can extend beyond the third current collector to cover the substrate 2. By covering the third current collector 5c, the electrolyte material can also form the resistive layer 8.

In a particular embodiment, the electrolyte layer continuously covers the first and third current collectors 5a and 5c. The electrolyte layer can be deposited through a mask or be deposited on the whole of the substrate and then be etched if required.

A second pattern made from a second electrode material is then formed. This second pattern can be formed by deposition through a mask or by deposition followed by etching of the second electrode material. According to the embodiments, the second pattern can partially or completely cover the first pattern. It is also possible to provide for the second pattern to extend beyond the first current collector for example to come into contact with the substrate 4. The second pattern will advantageously form the second electrode 4b.

The second pattern is separated from the first pattern by the electrolyte layer in order to avoid electric short-circuits.

The second current collector material is deposited through a mask to form the second and fourth current collectors 5b and 5d. As a variant, the second current collector material is deposited and then etched to form the second and fourth current collectors 5b and 5d.

The second current collector 5b is deposited in contact with the second electrode material. The fourth current collector 5d is deposited in contact with the electrolytic layer which forms the resistive layer 8.

The third current collector 5c, second electrolytic layer and fourth current collector 5d form the thermometer.

In the illustrated examples, the electrolyte pad is the only one to connect the two collectors. As a variant, it is possible to provide a second connection with a second pad made from resistive material which can also connect the two collectors. The two resistances are connected in parallel. This second connection can be made from the same material as the first connection or from a different material.

If the material of the second connection is different from that of the resistive layer 8, the resistance value of this second pad can be independent from the temperature or on the contrary dependent on the temperature. As the total resistance changes with the temperature, the thermometer function is preserved.

The resistive layer 8 can be formed by a layer made from a single electrolyte material, but it is also possible for the resistive layer 8 to be formed by several identical or different electrolyte layers. It is further possible to associate the second electrolyte layer with one or more electrically conductive layers connecting the third collector with the fourth collector. The electrolytes layers can be mounted in series and/or in parallel.

It is also possible to associate the second electrolyte layer with one or more electrically conductive layers. For example, the electrolyte layer and at least one conductive layer are mounted in parallel to connect the third collector with the fourth collector. This embodiment is less advantageous than the preceding ones because the resistance which exists between the current collectors is formed partly by the conductive layer and partly by the resistive layer, which makes the measurement more difficult. It is also possible to provide for the resistive layer to be formed by the series connection of one or more zones of electrolyte material with one or more zones of electrically conductive material. A zone of electrically conductive material separates two consecutive zones of electrolyte material.

The invention claimed is:

1. Electrochemical device, comprising a first stack of solid thin layers formed on a substrate, said first stack forming a battery and comprising:
   a first electrode and a second electrode separated by an electronically insulating and ionically conductive first electrolyte layer,
   a first current collector in contact with the first electrode,
   a second current collector in contact with the second electrode, the first current collector and second current collector being electronically isolated by the first electrolyte layer, said electrochemical device comprising a second stack different from the first stack and forming a thermometer, said second stack comprising:

a third current collector and a fourth current collector, a resistive layer comprising a second electrolyte layer in direct contact with the third current collector and fourth current collector and electrically separating the third current collector from the fourth current collector, the second electrolyte layer being ionically dissociated from the first electrolyte layer, said device comprising a control circuit configured to measure the resistance of the resistive layer.

2. Electrochemical device according to claim 1, wherein the second stack is devoid of a positive electrode material in contact with the third current collector and the second electrolyte layer.

3. Electrochemical device according to claim 2, wherein the second stack is devoid of a second electrode material in contact with the fourth current collector and the second electrolyte layer.

4. Electrochemical device according to claim 1, wherein the first current collector is common with the third current collector and wherein the second current collector is electronically dissociated from the fourth current collector.

5. Electrochemical device according to claim 1, wherein the first electrolyte layer and the second electrolyte layer are formed by the same electrolyte material.

6. Electrochemical device according to claim 1, wherein the second stack successively comprises, in a direction passing through said second stack and the substrate: the third current collector, the resistive layer and the fourth current collector.

7. Electrochemical device according to claim 6, wherein the third current collector is partially covered by the resistive layer and wherein the fourth current collector partially covers the resistive layer and third current collector, the fourth current collector leaving at least one side wall of the resistive layer uncovered.

8. Electrochemical device according to claim 6, wherein the fourth current collector leaves a part of the top wall of the resistive layer uncovered.

9. Electrochemical device according to claim 1, wherein the resistive layer partially covers a top surface of the third current collector so as to define an area devoid of overlap in the form of a ring, and wherein the fourth current collector completely covers the resistive layer, an insulating film separating the third and fourth current collectors.

10. Electrochemical device according to claim 1, wherein the first current collector is electrically connected to the third current collector.

11. Electrochemical device according to claim 1, wherein the second current collector is connected to the fourth current collector.

12. Electrochemical device according to claim 10, wherein the battery delivers a current flowing through the resistive layer of the thermometer.

13. Electrochemical device according to claim 1, wherein a thermally insulating layer covers the first stack and the second stack.

14. Electrochemical device according to claim 1, wherein the control circuit is configured to compare the measured resistance of the resistive layer with at least one threshold to enable or disable charging and/or discharging of the battery.

15. Electrochemical device according to claim 1, wherein the control circuit is supplied by the battery.

16. Fabrication method of an electrochemical device, comprising the following steps to produce a first stack forming a battery:

forming a first electrode and a second electrode separated by an electronically insulating and ionically conductive first electrolyte layer, forming a first current collector, the first current collector being connected to the first electrode, forming a second current collector, the second current collector being connected to the second electrode, the first current collector and second current collector being electronically isolated by the first electrolyte layer, and comprising the following steps to produce a second stack distinct from the first stack to form a thermometer, the second stack being formed by means of the following steps:

forming a second electrolyte layer so as to form a resistive layer, forming third and fourth current collectors in contact with the resistive layer and separated by the resistive layer, connecting the third and fourth current collectors to a control circuit configured to measure the resistance of the resistive layer.

17. Method according to claim 16, wherein the first electrolyte layer is formed at the same time as the second electrolyte layer.

18. Method according to claim 16, wherein the first current collector is formed at the same time as the third current collector.

19. Method according to claim 18, wherein the second current collector is formed at the same time as the fourth current collector.

20. Electrochemical device according to claim 11, wherein the battery delivers a current flowing through the resistive layer of the thermometer.

\* \* \* \* \*